United States Patent Office 3,418,946
Patented Dec. 31, 1968

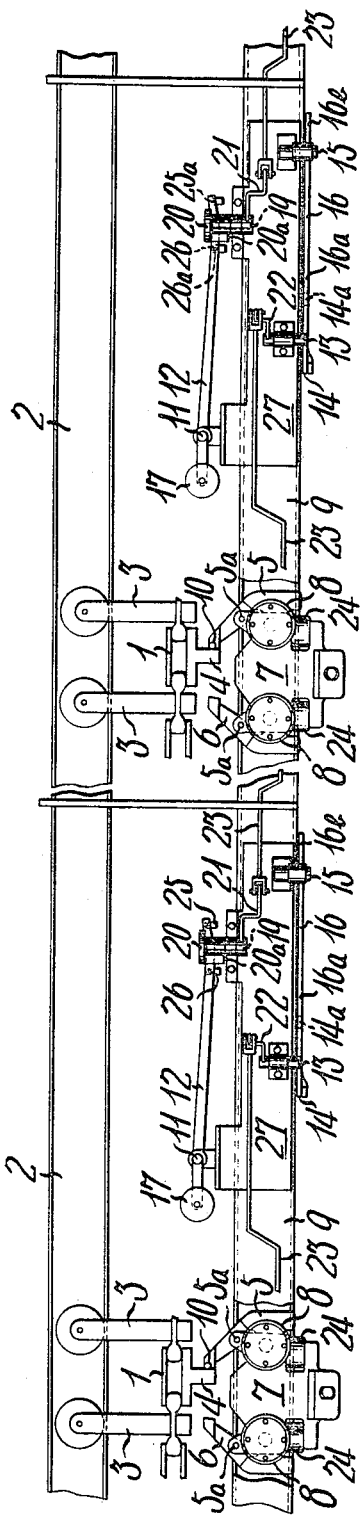

3,418,946
AUTOMATIC STOP AND FEEDER MECHANISM FOR TROLLEY CONVEYORS
Satoru Yokoi, Kadoma, and Kazumi Ohmura, Toyonaka, Japan, assignors to Tsubakimoto Chain Manufacturing Company, Limited, Osaka, Japan, a corporation of Japan
Filed May 20, 1966, Ser. No. 551,658
Claims priority, application Japan, May 24, 1965, 40/30,564
6 Claims. (Cl. 104—172)

ABSTRACT OF THE DISCLOSURE

A load trolley stop and feed control system having plural stopping stations along the trolley track with each trolley having a pivotal dog on the trolley engaged by a pusher on a driven power chain with a pivotal balance arm being mounted on each station and being movable by a rotary cam into the path of a pin on the dog to pivot the dog out of driven relationship with the pusher and with a linkage means connected from the cam to a bell crank engageable by the trolley downstream of the cam at the next downstream station for simultaneously actuating the cam to disconnect the drive to a succeeding load trolley with each balance arm including a lower surface attached check stopper for arresting inertial movement of the trolley after disconnection of the drive to its dog.

---

This invention relates to a stop and feeder mechanism for use in a trolley conveyor and to a means for operating said mechanism, and more particularly to a proposition of storing load trolleys in such a manner that, when one load trolley is stopped, other trolleys coming in succession are stopped and retained in due order at fixed places for a fixed period of time.

There have been heretofore many propositions for the method of stopping and feeding trolleys by engaging a pusher with dogs or releasing the former from the latter, said pusher being attached to a drive chain which is continuously driven parallelly above the load trolleys and said dogs being provided to said load trolleys. For instance, one structure comprises fitting a rotatable cross arm in a horizontal slot formed in the pusher frame of the drive chain so as to be rotatable longitudinally of the horizontal slot, and disposing a push spring between the retainer of said cross arm and said pusher. In the structure, when external force by man or machine from the direction opposite to that in which a load trolley travels is given to the cross arm that works on the dogs of the load trolley from the side of the load trolley, the cross arm is retracted within the slot of the pusher arm against the force of said push spring and is released from a stopper separately provided on the pusher arm, thereby to release the cross arm from the dogs of the load trolley.

The method described has a disadvantage that separate external force must be imparted to the trolley or the load thereof which it is intended to stop and that the force must be held continuous and unless otherwise said trolley or load is carried away by the pusher of the chain driven around in succession. Furthermore, said method is attended with the trouble to have to provide all the pushers of the chain with the structure described.

Another known structure is a device generally termed an indexer in which a chain trolley is caused to escape above a load trolley thereby to release the load trolley from the chain trolley and retain same. This type of device also makes it necessary to provide each of the chain trolleys with a special release member or a movable rail portion for raising the selected portion of the chain track and power means for moving the movable rail portion. Accordingly, te user feels inconvenienced in that the stop and feeder stations of load trolleys cannot be readily altered.

A primary object of the invention is to provide a novel means of an indexer by which one load trolley and other load trolleys coming in succession are released in due order from the pushers of the drive chain at selected stations along a conveyor line in a trolley conveyor and the load trolleys are retained in safe while the spaces between the conveyed workpieces are maintained as desired.

Another object of the invention is to provide a stop and feed mechanism, by which not only one load trolley can be stopped but other load trolleys coming in succession are automatically brought to a halt in due order by stopping one foremost load trolley, in a structure which has mechanical versatility.

A further object of the invention is to make it possible to provide certain desired stations along the conveyor line with as many stop and feeder sections as required not by providing each of chain pushers or load trolleys with complicated mechanism but merely by adding a simple unit to the required sections of the load track.

The characteristic aspects of the invention which achieve the described objects will become apparent from the following detailed description of one preferred embodiment of the invention made with reference to the accompanying drawings in which:

FIG. 1 is a side elevational view of a trolley conveyor mechanism according to the invention;

FIG. 2 is a plan view of the mechanism in FIG. 1 but with a chain trolley portion removed therefrom;

Figure 3:
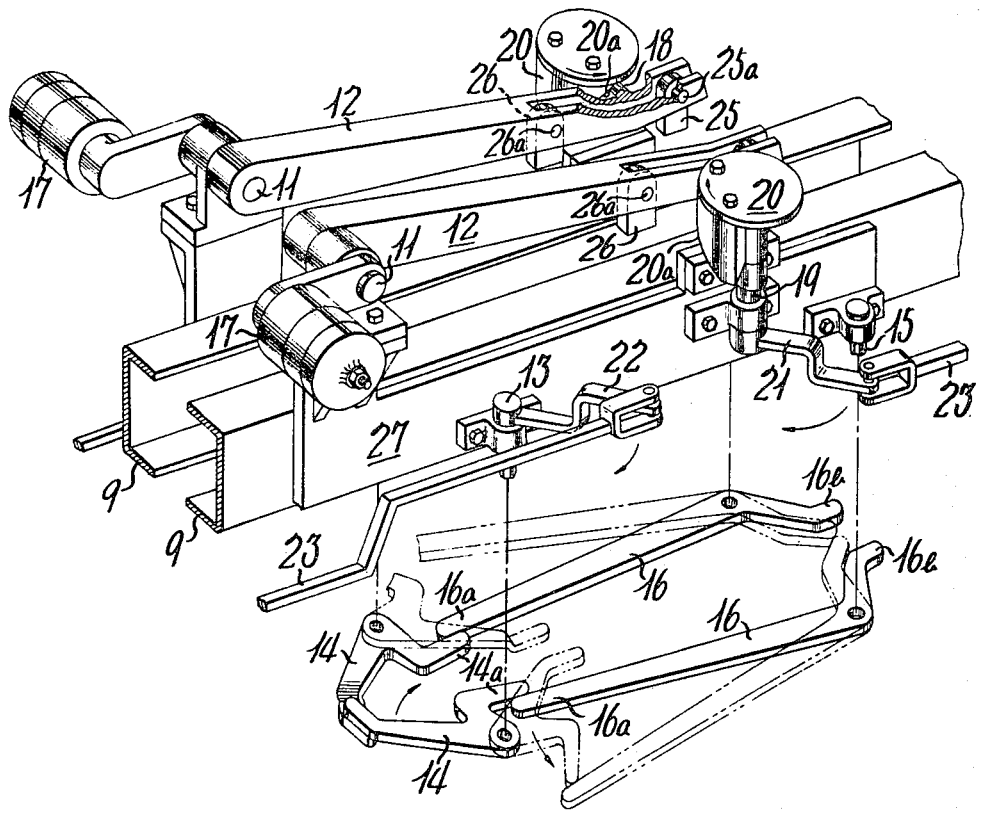
FIG. 3 is a perspective view of one unit of the mechanism according to the invention.

Referring now to the drawings, a drive chain 1 is suspended on a chain track 2 by chain trolleys 3 and is moved to the right side in the drawings. The chain 1 is provided at every suitable pitch thereof with pushers 4 extending downwardly. On a lower load track 9 provided in parallel with the chain track 2 are laid a pair of right rollers 8 and a pair of left rollers 8 of a load trolley 7. Said load trolley 7 is provided with dogs 5 and 6 to be pushed by said pushers, said dogs 5 and 6 being disposed so as to face inwardly with respect to each other and to be allowed to pivot respectively on one of pivot shafts 5a of the trolley 7.

According to the invention, on both sides of the front dog 5 of said dogs a release pin 10 is protruded horizontally and at right angle with the direction in which trolley 7 moves forward. On the other hand, above a frame 27 fixed to both sides of the load track 9 is disposed a fulcrum shaft 11 horizontally and at right angle with the direction of the track 9. A balance arm 12 adapted to escape upwardly or come down on the path of the release pin 10 provided to the dog 5 of said load trolley 7 is journaled on the fulcrum shaft 11. When the balance arm 12 is down on the path of the load trolley 7 in accordance with the construction described, the pin 10 of the dog 5 of the load trolley 7 is pushed down by the lower surface of the balance arm 12, with the result that the dog 5 leans inwardly to release the dog 5 from the pusher 4. On the other hand, at the lower end of a short spindle 13 pivoted to the outside of the lower portion of the frame 27 is rotatably supported a bell crank arm 14 the forward end of which extends on the path of guide rollers 24 provided on the lower portion of the load trolley 7. Furthermore, a short spindle 15 is disposed at certain intervals from said short spindle 13 in the direction in which the load trolley moves forward, and is pivoted in like manner to the outside of the lower portion of the frame 27, and a release arm 16 the forward end 16a of which is in contact with both sides of tail ends 14a of the bell crank arms 14 is journaled on said short spindle 15. At the opposite end of said release arm 16 is formed a tail 16b which extends slantingly on the path of the guide rollers 24. When a load trolley 7 is coupled with pusher 4 of the drive chain 1 in accordance with the structure described and moves forward, the guide roller 24 of the load trolley 7 rotates the crank arm 14 as shown by a chain line in FIG. 3, thereby to actuate the release arm 16 to cause a tail 16b to block the path of the guide roller, but when the guide roller 24 pushes said tail 16b open, the operation described above is reversed so that the bell crank 14 is again pushed on the path of the guide roller 24. As will be presently described, the described operation of the bell crank arm 14 is related with the actuation of the cam mechanism of the balance arm by which the retention of load trolleys coming in succession is carried out.

At the opposite end of said balance arm 12 is provided a weight 17, and on the outside of the tip of the balance arm 12 a pin or a roller member 18 is provided. By the roller member 18 is constituted the following mechanism. A cam 20a formed on the lower surface of a cylindrical cam 20 attached to the upper portion of another longitudinal shaft 19 journaled in the frame 27 is brought into contact with the upper portion of said member 18. To the lower end of said longitudinal shaft is fixed a short lever 21. To the end of the lever 21 is connected the end of a connecting rod 23 extended from a unit mechanism disposed adjacently ahead of the described unit in the frame 27 in the direction in which the load trolley travels. The other end of the connecting rod 23 is connected with a lever 22 fixed to the short spindle 13 with which the bell crank arm 14 just now described is connected. Accordingly, when the bell crank arm 14 finishes one cycle of operation, the connecting rod 23 makes one stroke of reciprocating movement.

When the connecting rod 23 is moved in the direction of arrow in FIG. 2, the lever 21 is rotated and consequently the cam 20 is rotated, with the result that the balance arm 12 is leaned downwardly around a pin 11 by means of the cam face 20a and the roller member 18 of the balance arm 12. At the end of the balance arm 12 is suspended a hanging stopper 25 by means of a pin 25a. In a position contrary to the direction in which the trolley travels is supported by a shaft 26a another suspended check stopper 26 which can turn in the direction in which the trolley travels but which can not move in a contrary direction.

Figure 4:
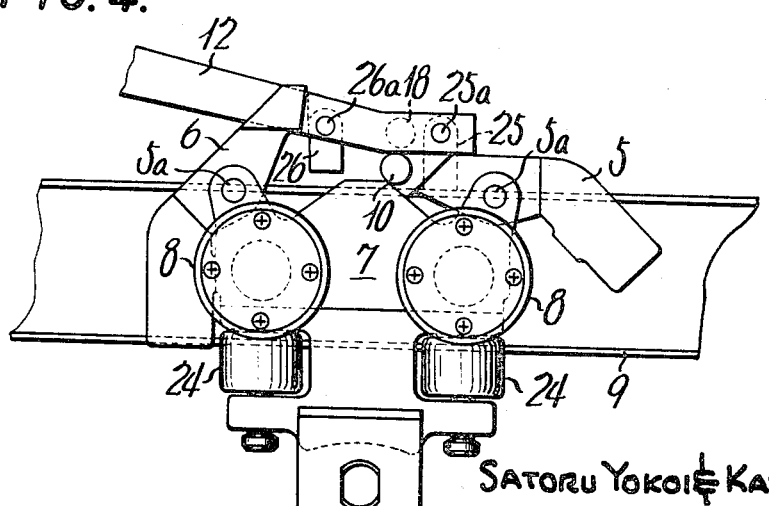
FIG. 4 is a side elevational view showing the relation between a trolley and a balance arm and stopper of the mechanism according to the invention.

When a pin 10 provided on both sides of the dog 5 of the load trolley 7 comes near the lower surface of the balance arm 12 which is pushed down by said cam 20, the pin 10 is pushed down by the lower surface of the balance arm 12, with the result that the dog 5 is leaned inwardly around the shaft 5a thereof to be released from the pusher 4 of the drive chain 1. The trolley 7 travels further for itself by force of inertia and pushes said check stopper 26 upwardly and then hits against the hanging stopper 25 at the foremost end and is brought to a halt as shown in FIG. 4.

Now description will be made of the related operation of the device according to the invention in conjunction with two trolleys arranged in front and in the rear. While the load trolleys 7 shown in FIG. 1 are being moved forward by the pusher 4 of the drive chain 1, the guide roller 24 of the preceding trolley 7 hits against the bell crank lever 14 extending on the path of the load trolleys, whereupon the lever 14 is rotated inwardly, as shown in FIG. 3, to cause the lever 22 to move in the same direction through the short spindle 13. At this time the rotation of the lever 22 pushes the connecting rod 23 rearwardly (to the left side in the drawings), and rotates in the direction of arrow the cam 20 which actuates the balance arm 12 which works on the pin 10 of the trolley 7 in the rear position through the lever 21 connecting rod 23, and lowers the balance arm 12 through the roller member 18 by means of the cam face 20a of the cam 20. When, accordingly, the pin 10 of the dog 5 of the trolley 7 in the rear position hits against the lower portion of the balance arm 12, the pin 10 rotates the dog 5 inwardly around the shaft 5a of the latter through the resistance of the lower surface of the balance arm, so that the dog 5 is released from the pusher 4 of the drive chain 1 and stops the rear trolley 7. The time when said pin 10 is released from the pusher 4 through the resistance of the lower surface of the balance arm 12 is preferably just before the stopper 26. For the pin 10 travels for itself further toward the forward end of the balance arm 12 by force of inertia of the load trolley 7. Thus, the load trolley released from the pusher 4 passed the check stopper 26 by pressing it upwardly, and only when it has reached the hanging stopper 25 it is completely brought to a halt. When the trolley is driven at low speed, the force of inertia is small, and accordingly a distance between the position in which the pin 10 is released from the pusher and the position of the hanging stopper 25 may be permissibly short. When on the contrary the travelling speed of the trolley is high, the load trolley can be stopped without giving impact thereto by increasing said distance.

The hanging stopper 25 works in such a manner that the flat surface of the lower end of the stopper 25 rests on the upper surface of the load track, so that unless the balance arm 12 is elevated, the stopper 25 works effectively to prevent the pin 10 from travelling further. Accordingly, the pin 10 is kept stopped between two pairs of stoppers 25 and 26, and the trolley 7 is stopped within such a range. Thus, when the stop and feeder mechanism of the invention is provided on the load track, all trolleys coming in succession are stopped and retained one after another in the manner described. The whole group of trolleys is stopped and retained at intervals corresponding to those between one lever 22 and another.

Figure 5:
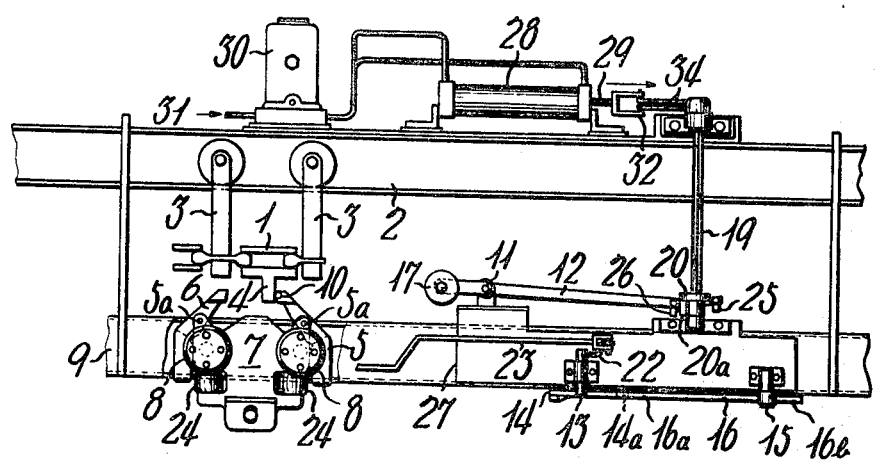
FIG. 5 is a side elevational view of an instructions mechanism of the invention.
Figure 6:
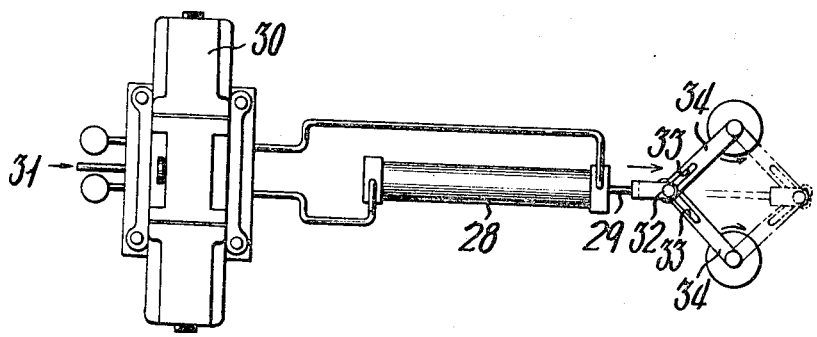
FIG. 6 is a plan view, in part, of FIG. 5.

In the invention, the initial operation for stopping and retaining conveyed workpieces is carried out by manually rotating the shaft of the cam 20. This fact will be readily understood without description in conjunction with the drawings. It is virtually practical to carry out this operation by an automatic instructions mechanism. To mention an embodiment of said instructions mechanism with reference to FIGS. 5 and 6, an operation shaft 19 of the initial stop and feeder mechanism unit is extended so as to reach the top of a chain track 2. On a suitable base provided on the chain track 2 are arranged a pneumatically actuated cylinder 28 and a control valve chest 30 thereof. A compressed air from air source or an air compressor 31 is supplied to or discharged from the cylinder 28 by means of an electrically controlled valve, thereby to reciprocate a piston rod 29. The other end of a lever arm 34 connected by means of a slot 33 to a pin 32 provided at the end of said piston rod is fixed to the operation shaft 19 of said cam 20. If instructions are given and the cylinder 28 works thereby to move the piston rod 29 to the right side in FIGS. 5 and 6, the lever arm 34 indicated in the full line pre-operational position thereof in the figures rotates the cam 20 through 90° via the shaft 19. When the cam 20 works, the balance arm 12 of the initial unit is forced to be lowered, thereby to push downwardly the pin of the dog of a load trolley coming first to the balance arm 12 and releases the dog from the pusher of the drive chain, with the result that retaining of the trolley in the foremost position begins. Accordingly, the whole group of trolleys coming in succession thereafter can be halted or moved forward. When operation of the cam 20 by hand or by said automatic instructions mechanism is not effected, the guide roller 24 of the load trolley 7 allows the bell crank arm 14 and release arm 16 to effect one cycle of operation, thereby to move the cam 20 in succeeding position to cause the balance arm 12, in turn, to be lowered, but such change in the positions of the cam and the balance arm takes place only a very short time and is followed by reinstatement in the original positions thereof, so that the load trolley 7 is allowed to freely travel.

As described, the present invention can provide a very useful conveyor system, under which, when operation is conducted or instructions are given to stop and retain the load trolleys, a headmost trolley is stopped in the beginning and then all the other trolleys are stopped at certain intervals, and accordingly in such a case in which some hitch or retardation or the like occurs at certain stage of assembly-line operation, the headmost trolley together with all the other trolleys coming in succession are suspended in operation at the end of any stage of process until said hitch or retardation is removed.

The invention provides convenience with which a free selection of intervals at which trolleys are retained can be made by varying the length of a connecting rod so that hitting of one conveyed workpiece against another as has been the case with the prior types of mechanisms can be prevented. Since provision of a connecting rod with a guide or support is simple, a very long rod can be used and an operation to meet any required process of operation is possible at any suitable place. Furthermore, all means for stopping and feeding the trolleys are arranged at preselected stations along the load track and operated, and simple also in structure. Consequently, the device of the invention has an advantage that a very few breakdowns occur in the mechanism of the invention when compared with conventional types of devices by which stop means themselves move together with conveyor chains or trolleys and that the device works more quietly than the known types in which the spring means provided make a noise, because there are no spring means used with the invention. The means for stopping and feeding the trolleys used with the invention are incorporated into the device in the form of a unit construction, and is simple in being attached to the load track. Moreover, provision of said means only in the position in which the means is required for stopping the trolleys can serve the purpose and hence the device is superior in practical applicability in that it is not only very economical in the cost of construction, simple in structure, but also requires no such fine mechanical precision. Furthermore, additional provision of simple stoppers as viewed in the embodiment of the invention can effectively stop the trolleys in the exact positions thereof and prevent reverse travelling.

The device of the invention has been illustrated in the embodiment thereof having such a structure in which a balance arm and related cam thereof and a bell crank arm and related release arm thereof are arranged in a pair on both sides of the load track, respectively, but it has been confirmed that provision of such members on one side alone can have substantially equal effects. It should be understood that the embodiment of the invention has been described and shown not in a limiting sense and that various changes and modifications can be made therein without departing from the scope and spirit of the invention.

What is claimed is:

1. In a trolley conveyor adapted to be operated by engaging a pusher of a drive chain trolley between front and rear dogs pivotally supported on a load trolley so as to be rotated toward each other, a stop and feeder mechanism including a balance arm pivotally mounted above the path of a pin laterally extending from the front dog of said load trolley, said pin extending at a right angle with respect to the direction in which the trolley moves forward, said balance arm having a roller member laterally extending from the side of one end thereof to be engaged and actuated by a cam, which when actuated serves to pivotally lower said one end of the balance arm from an elevated position to a lower position and said balance arm being provided at adjacent the said one end thereof with a pivotally supported hanging stopper adapted to prevent the forward movement of the load trolley, said hanging stopper being rotatable at the time of the balance arm is in the elevated position thereof, but having a flat lower surface which is seated fixedly on the upper surface of the track of the load trolley with the flat lower surface thereof held in contact with said upper surface when the balance arm is in the lowered position thereof.

2. A stop and feeder mechanism for a trolley conveyor described in claim 1 additionally including a reverse movement preventing check stopper pivotally supported on said balance arm in a position slightly spaced from said hanging stopper in a direction opposite to that in which the load trolley moves forward, said check stopper having limited pivotal movement in one direction so as to prevent reverse movement of the pin of the dog of the load trolley.

3. In a trolley conveyor system of the type including load trolley track means for supporting a plurality of load trolleys for movement along its length and a power driven chain supported for movement along a path adjacent said load trolley track with the power driven chain including pusher means connected to said power driven chain for movement therewith with each of said load trolleys including front and rear dogs pivotally supported for movement toward each other so that said front dog is movable between a retracted position and an extended position in which a portion of said front dog lies within the path of movement of said pusher means and is drivingly engaged by said pusher means so as to cause the front dog and its associated load trolley to be moved along the load trolley track means by said pusher means, the improvement comprising load trolley stop and feeder means including a pin extending laterally from said front dog, a pivotal balance arm pivotally supported above and adjacent said load trolley, track means for movement between a deactivated position in which the pins on said front dogs pass adjacent to said balance arm as the load trolleys move past said balance arm but do not engage said balance arm and an activated position in which one surface of the balance arm slantingly extends into the path of travel of the pins so that the pin on the dog of the next trolley to move adjacent said balance arm engages said balance arm as the next trolley moves adjacent said balance arm to cause the dog supporting said pin to pivot to its retracted position so that said pusher means ceases to engage said front dog in driving relationship and rotary cam means engaging a cam follower extending from one side of said balance arm for moving said balance arm to its activate position and for lockingly retaining said balance arm in its activated position while said cam is activated so that said cam means provides a control for pivoting the balance arm and consequently deactivating the drive to the load trolleys with no possibility that engagement of the load trolley with the balance arm will cause undesired displacement of the balance arm.

4. The invention of claim 3 additionally including a bell crank arm mounted adjacent the load trolley track so that said arm extends into the path of guide rollers on the load trolley, a lever attached to said bell crank arm for pivotal movement therewith, a pivotal release arm having an upstream end engaging said bell crank arm and a downstream end movable into blocking relationship with respect to said track when said bell crank arm is pivoted by engagement of a trolley therewith, a connecting rod extending from one end of said lever in an upstream direction with respect to the direction of movement of said load trolleys, the other end of said connecting rod being connected to the cam actuating means of an adjacent upstream stop and feeder mechanism so that pivotal movement of said bell crank caused by engagement of a load trolley therewith is transmitted to said cam actuating mechanism so that a succeeding trolley arriving at said next adjacent upstream stop and feeder mechanism will be disconnected from driving relationship with the pusher means on said chain by its respective balance arm upon the engagement of said bell crank arm by another trolley downstream of said succeeding trolley.

5. A stop and feeder mechanism of a trolley conveyor described in claim 4 in which the bell crank arm that extends on the path of guide roller is rotated by engagement with the guide roller and the portion of the bell crank arm engaged by the release arm moves to cause the release arm to rotate around its pivot in such a manner that when the guide rollers have pivoted the bell crank from blocking relation to the track, the tail end of the release arm extends slantingly so as to block the path of said guide rollers.

6. A stop and feeder mechanism of a trolley conveyor described in claim 3 in which the balance arm is pivoted downwardly from above the path of the pin provided on the front dog of the load trolley with said cam follower on the balance arm being a roller member on the side of the forward end of said balance arm said cam being a cylindrical cam engaging said roller member thereby to move said balance arm up and down with said cam activating means including an operation shaft for said cylindrical cam having a lever affixed to one end and connecting to a pin on the forward end of a piston rod of an actuating cylinder by a slot provided in said lever, said actuating cylinder being adapted to operate by given instruction means provided above the chain track.

References Cited

UNITED STATES PATENTS

| 2,344,155 | 3/1944 | McBride et al. | 104—191 |
| 2,971,474 | 2/1961 | Klamp | 104—172 |
| 3,092,038 | 6/1963 | Orwin | 104—178 XR |

FOREIGN PATENTS

| 819,102 | 10/1951 | Germany. |
| 998,732 | 7/1965 | Great Britain. |

ARTHUR L. LA POINT, *Primary Examiner.*

H. BELTRAN, *Assistant Examiner.*

U.S. Cl. X.R.

104—178, 253